(12) United States Patent
Huang et al.

(10) Patent No.: US 8,630,518 B2
(45) Date of Patent: Jan. 14, 2014

(54) ULTRA-THIN WAVEGUIDE WITH CONTROLLED LIGHT EXTRACTION

(75) Inventors: Jiandong Huang, Vancouver, WA (US); Apostolos T. Voutsas, Portland, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 41 days.

(21) Appl. No.: 13/484,346

(22) Filed: May 31, 2012

(65) Prior Publication Data

US 2013/0315534 A1 Nov. 28, 2013

Related U.S. Application Data

(63) Continuation-in-part of application No. 13/477,922, filed on May 22, 2012.

(51) Int. Cl.
*G02B 6/26* (2006.01)
(52) U.S. Cl.
USPC .......................................... 385/39; 385/901
(58) Field of Classification Search
USPC .................................................. 385/39, 901
See application file for complete search history.

(56) References Cited

U.S. PATENT DOCUMENTS 7,733,439 B2 * 6/2010 Sampsell et al. ................ 349/62

* cited by examiner

*Primary Examiner* — Omar Rojas
(74) *Attorney, Agent, or Firm* — Law Office of Gerald Maliszewski; Gerald Maliszewski (57) ABSTRACT

A system and method are provided for using bubble structures to control the extraction of light from a waveguide top surface. The method determines a maximum angle ($\alpha$) of light propagation through a waveguide medium relative to a first horizontal direction parallel to a waveguide top surface. A plurality of bubble structures is provided having a refractive index less than the waveguide medium. The bubble structures have a base, and sides formed at an acute angle upwards with respect to the base. The bubble structure bases are separated by gap (W), have a height (H), and have a top separated from a waveguide top surface by a space (h). The method varies the gap (W), the height (H), and the space (h). In response, the intensity of light extraction at even the maximum angle ($\alpha$) of light propagation, can be controlled from the waveguide top surface.

21 Claims, 6 Drawing Sheets

ULTRA-THIN WAVEGUIDE WITH CONTROLLED LIGHT EXTRACTION

RELATED APPLICATIONS

This application is a Continuation-in-Part of a pending application entitled, METHOD FOR THE DESIGN OF UNIFORM WAVEGUIDE LIGHT EXTRACTION, invented by Jiandong Huang et al., Ser. No. 13/477,922, filed May 22, 2012, which is incorporated herein by reference.

BACKGROUND OF THE INVENTION

1. Field of the Invention

This invention generally relates to light waveguide mediums and, more particularly, to a system and method for controlling the intensity of light extracted from a waveguide surface.

2. Description of the Related Art

Figure 1:
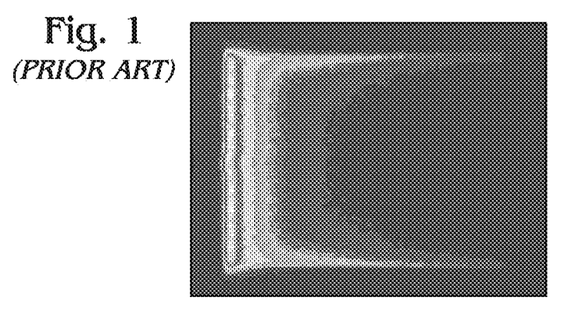
FIG. 1 is a plan view of representing light extracted from a liquid crystal display (LCD) backlight (prior art).

FIG. 1 is a plan view of representing light extracted from a liquid crystal display (LCD) backlight (prior art). Mura is a Japanese term for unevenness, inconsistency in physical matter, or human spiritual condition. This word is used in LCD to describe undesired illumination non-uniformity due to design or fabrication defects. Mura can come from both front and back panels. As shown in the figure, more light is being extracted near the input light emitting devices (LEDs) on the left side of the panel, than on the right side of the panel. The significant amount of light extracted near the light source leaves an insufficient amount of light to be extracted from the right side of the panel. Backlight panels are conventionally designed using a significant degree of trial-and-error to find the correct balance of light extraction and illumination.

Figure 2:
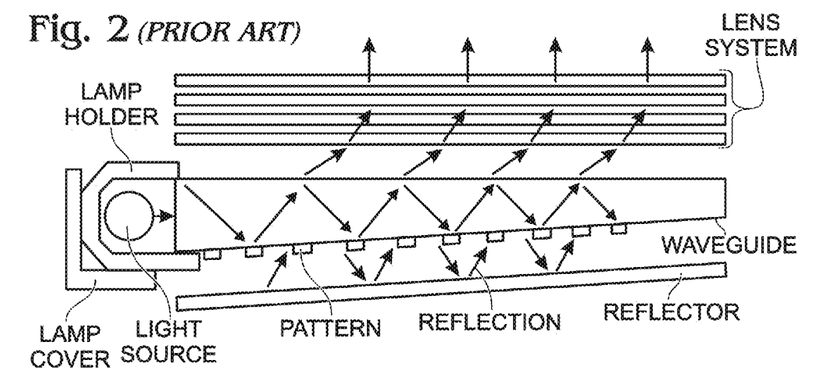
FIG. 2 is a partial cross-sectional view of a liquid crystal display (LCD) backlight system (prior art).

FIG. 2 is a partial cross-sectional view of a liquid crystal display (LCD) backlight system (prior art). Ideally, the system is intended to extract and collimate light (from the light source) up, through the waveguide top surface, to illuminate an LC panel (not shown).

Figure 3:
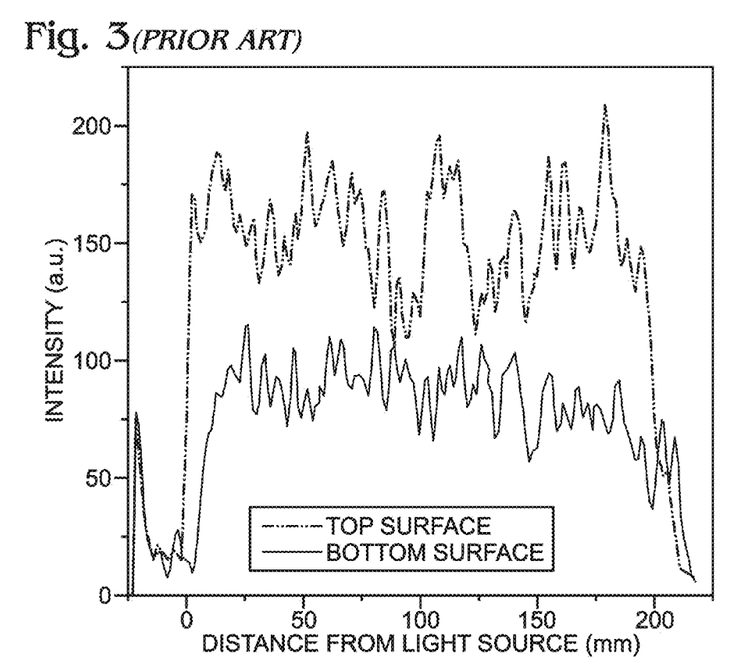
FIG. 3 is a diagram comparing the intensity of light extracted from the waveguide top and bottom surfaces (prior art).

FIG. 3 is a diagram comparing the intensity of light extracted from the waveguide top and bottom surfaces (prior art). Often, as shown in FIG. 2, a reflection pattern is added to the bottom of the waveguide to minimize the amount of light exiting the waveguide through the bottom surface. Alternatively or in addition, as shown in FIG. 2, a reflector can be added under the waveguide bottom surface. However, both these solutions undesirably increase the thickness and complexity of the backlight system.

Figure 4:
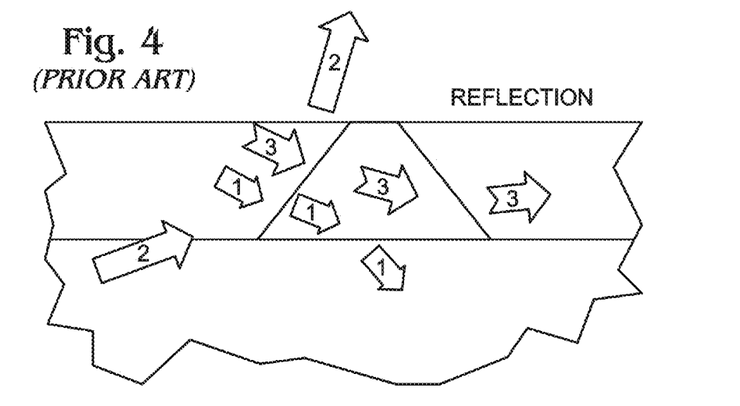
FIG. 4 is a partial cross-sectional view of a waveguide light extraction feature (prior art).

FIG. 4 is a partial cross-sectional view of a waveguide light extraction feature (prior art). Depending on where light strikes the bubble structure, it may be reflected to the waveguide bottom surface (the rays marked "1"), extracted from the waveguide top surface (the rays marked "2"), or realigned at an angle where it is likely to strike another bubble structure at a favorable angle (the rays marked "3").

Conventionally, rays (1) reflected to the waveguide bottom surface have been an undesirable limitation associated with the use of light extraction features.

It would be advantageous if backlight panels and waveguide devices could be more efficiently designed to control the intensity of extracted light from a specified waveguide surface.

SUMMARY OF THE INVENTION

Disclosed herein are a system and method that take advantage of the shape and spatial arrangement of bubble structures in a waveguide, to efficiently extract light from the front side of a waveguide with nearly 100% efficiencies, by minimizing unwanted backside light extraction. The gap, W, between bubble structures and the buried depth, h, are optimized so that even rays propagating through the waveguide at the maximum angle deviation, α, can be extracted from the waveguide top surface.

Accordingly, a method is provided for using bubble structures to control the extraction of light from a waveguide top surface. The method determines a maximum angle (α) of light propagation through a waveguide medium relative to a first horizontal direction parallel to a waveguide top surface. A plurality of bubble structures is provided having a refractive index less than the waveguide medium. The bubble structures have a base, and sides formed at an acute angle upwards with respect to the base. The bubble structure bases are separated by gap (W), have a height (H), and have a top separated from a waveguide top surface by a space (h). The method varies the gap (W), the height (H), and the space (h). In response, the intensity of light extracted at even the maximum angle (α) of light propagation can be controlled from the waveguide top surface.

In one aspect, the bubble structure have a flat top surface parallel to the waveguide top surface, and varying the gap (W), the height (H), and the space (h), includes solving:

$$\tan(\alpha) \approx (h+H)/W.$$

For example, W, H, and h may be varied so that when light propagating through the waveguide with the maximum angle (α) reflects off the waveguide top surface, creating a first reflected light, the first reflected light encounters a bubble structure. The first reflected light is then extracted from the waveguide top surface in either one or two more encounters with bubble structures. In another variation, where bubble structures without flat top surfaces are used, light can be extracted in a two-step process (two bubble structure encounters).

Additional details of the above-described method, and a waveguide with bubble structures for controlling light extraction, are provided below.

DETAILED DESCRIPTION

Figure 5:
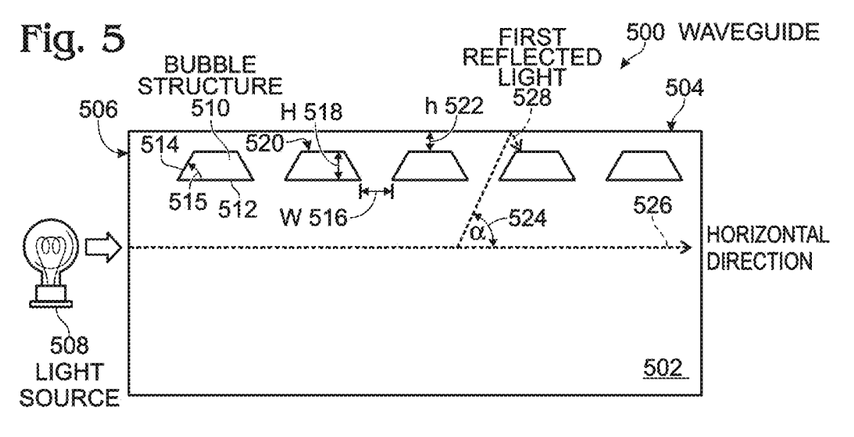
FIG. 5 is a partial cross-sectional view of a waveguide with bubble structures for controlling light extraction.

FIG. 5 is a partial cross-sectional view of a waveguide with bubble structures for controlling light extraction. The waveguide 500 comprises a waveguide panel 502 formed from a medium such as glass or polymer. The waveguide panel 502 has a top surface 504 for light extraction and at least one side surface 506 for light insertion. A light source 508 supplies light the waveguide panel (left) side surface 506. Alternatively but not shown, a different light source may additionally supply light to the opposite, right side of the waveguide panel. A plurality of bubble structures 510 (light extraction features) are embedded in the waveguide panel 502. The bubble structures 510 have a refractive index less than the waveguide medium. For example, if the waveguide panel is made from a polymer or glass, then it has an index of refraction (n) of about 1.5. Then, the bubble structures 510 can be made from air, having a refractive index of 1.

The bubble structures 510 have a base 512 parallel to the waveguide top surface 504 and sides 514 formed at an acute angle 515 upwards (towards the waveguide top surface 504) with respect to the base 512. The bubble structure bases 512 are separated by gap (W) 516. The bubble structures 510 have a height (H) 518, and have a top 520 separated from a waveguide top surface 504 by a space (h) 522. The gap (W) 516, the height (H) 518, and the space (h) 522 are defined with respect to a maximum angle ($\alpha$) 524 of light propagation through a waveguide medium relative to a first horizontal direction 526 parallel to a waveguide top surface 504. The maximum angle ($\alpha$) 524 of light propagation through a waveguide medium is $$\alpha \approx \sin^{-1}(1/n),$$

where n is the refractive index of the waveguide medium. In the case of polymer or glass, the maximum angle ($\alpha$) 524 is about 42 degrees.

As shown in FIG. 5, the bubble structures 510 are frustum bubble structures with flat top surfaces 520 parallel to the waveguide top surface 504. Some examples of frustum structures include a frustum-pyramid (as shown) and a frustum-cone. However, other frustum structures may also be used. In this case, the gap (W) 516, the height (H) 518, and the space (h) 522, are defined as follows:

$$\tan(\alpha) \approx (h+H)/W.$$

In other words, the bubble structures 510 are defined so that when light propagating through the waveguide with the maximum angle ($\alpha$) 524 reflects off the waveguide top surface 504, a first reflected light 528 is created that encounters a bubble structure.

As shown, the maximum light intensity from the light source 508 into the waveguide panel 502 is presented in the horizontal direction 526. However, it should be understood that maximum light intensity may be presented at other angles with respect to the waveguide panel side 506, and thus, through the waveguide panel at a smaller or larger maximum angle ($\alpha$). In such a manner the maximum angle ($\alpha$) may be modified to fit the needs of the design, thus affecting the values of h, H, and W.

Figure 6:
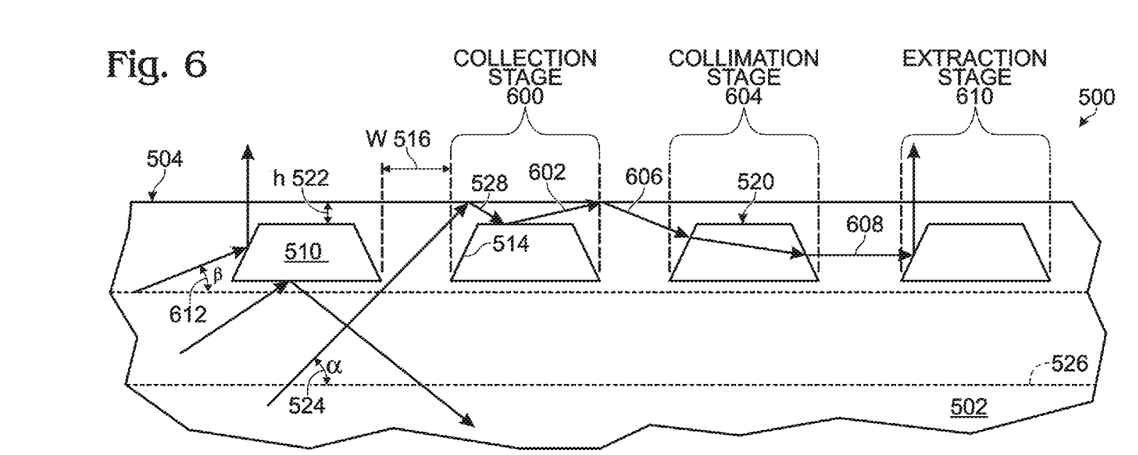
FIG. 6 is a partial cross-sectional view depicting the waveguide of FIG. 5 from a different perspective.

FIG. 6 is a partial cross-sectional view depicting the waveguide of FIG. 5 from a different perspective. Again, it should be noted that the bubble structures 510 have flat top surfaces 520 parallel to the waveguide top surface 504. In this aspect, there are combinations of bubble stages. A collecting stage 600 reflects the first reflected light 528 off a bubble structure top surface 520, creating a second reflected light 602. For incident angles less than a critical angle for total internal reflection (TIR), a collimating stage 604 accepts a third reflected light 606, which is the result of the second reflected light 602 reflecting off the waveguide top surface 504. The third reflected light 606 passes through two sides of a bubble structure 510, creating a collimated light 608. For incident angles greater than the critical angle for TIR, an extraction stage 610 reflects the collimated light off a side of a bubble structure 510 for egress via the waveguide top surface 504.

The critical angle, in accordance with Snell's law, is the angle of incidence above which total internal reflection occurs. For a light ray passing from glass into air, the light emanating from the interface is bent.

When the incident angle is increased sufficiently, the transmitted angle in air reaches 90 degrees, e.g., no light is transmitted into the bubble structure, but rather, it is reflected out towards the top surface. The critical angle can be found as follows:

$$n_1 \sin \theta_i = n_2 \sin \theta_r.$$

where n1 is the refractive index of waveguide panel and n2 is the refractive index of the bubble structure. Rearranging, the angle of incidence is:

$$\sin\theta_i = \frac{n_2}{n_1}\sin\theta_t,$$

or $$\sin \theta_i = n_2/n_1.$$

Note that angles less than the maximum angle 514, such as angle (B) 612, may be extracted directly off a reflection of the bubble structure side 514.

Figure 7:
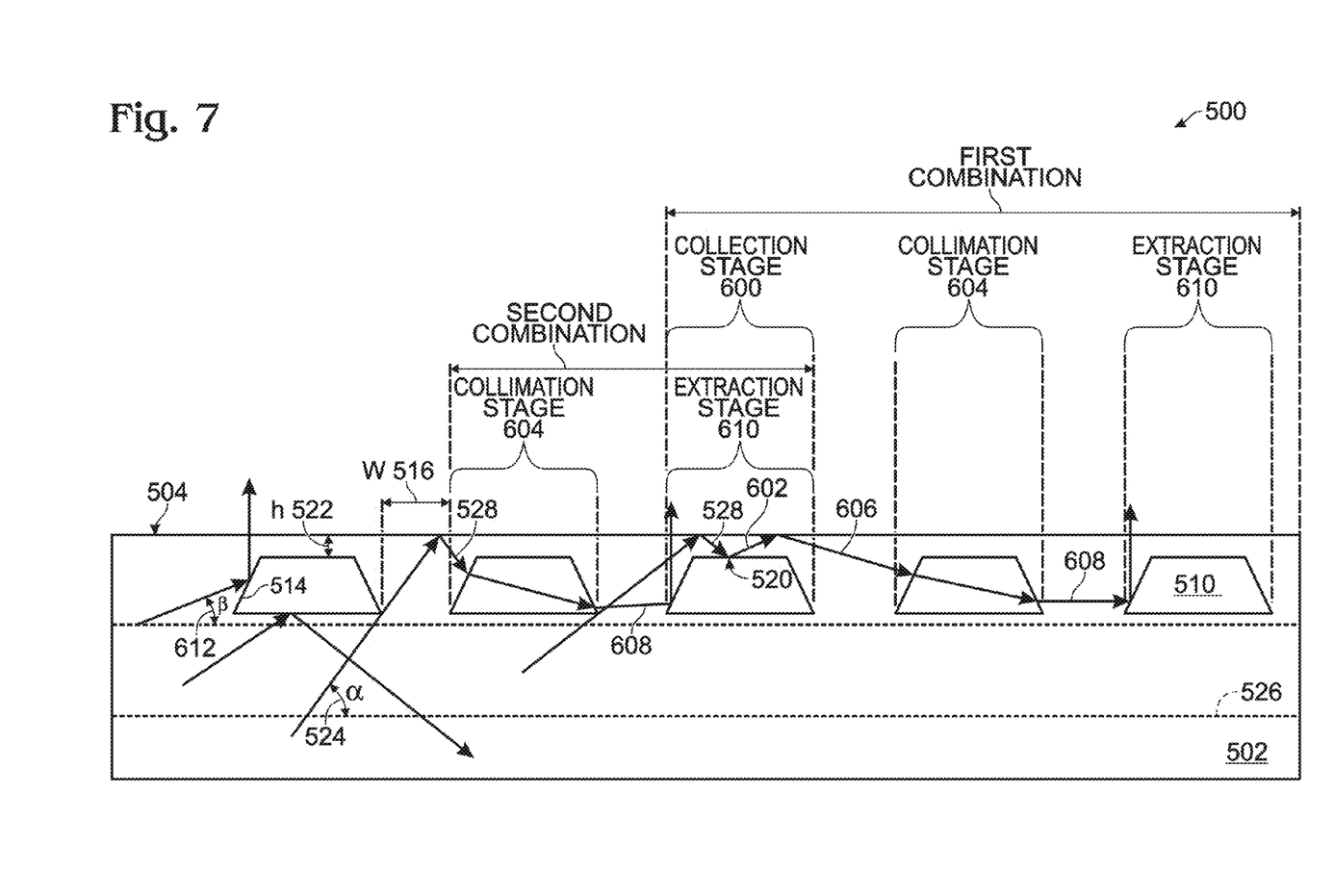
FIG. 7 is a partial cross-sectional view depicting a variation of the waveguide of FIG. 6.

FIG. 7 is a partial cross-sectional view depicting a variation of the waveguide of FIG. 6. In this aspect, the collection stage 600, collimation stage 604, and extraction stage 610 comprise a first combination of bubble structures as explained above in the description of FIG. 6. In this aspect, the waveguide also comprises a second combination of bubble structures. The second combination comprises the collimation stage 604 and the extraction stage 610. First reflected light 528 with incident angles less than the critical angle for TIR pass through two sides of a bubble structure 510, creating a collimated light 608. For incident angles greater than the critical angle for TIR, the extraction stage 610 reflects the collimated light off a side of a bubble structure and exiting via the waveguide top surface.

Figure 8:
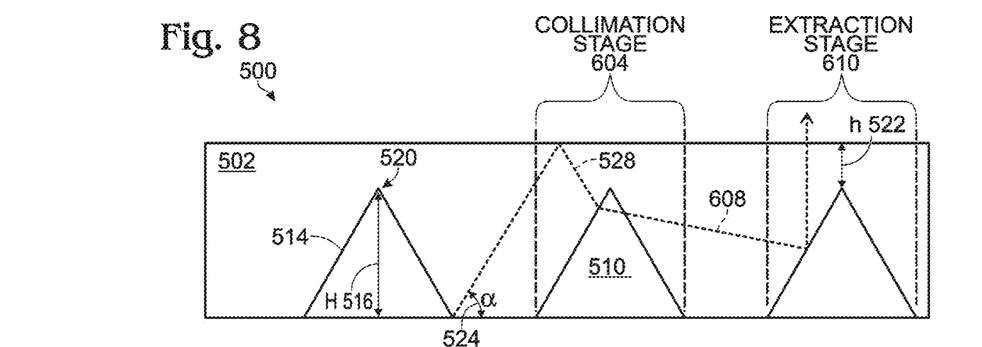
FIG. 8 is a partial cross-sectional view depicting a variation of the waveguide of FIG. 5.

FIG. 8 is a partial cross-sectional view depicting a variation of the waveguide of FIG. 5. In this aspect, the bubble structure top surfaces 520 need not be flat. For example, cone or pyramid structures may be used, although other shapes without a flat top surface may also be used. The combinations of bubble structures comprise a collimation stage 604 and an extraction stage 610. For incident angles less than a critical angle for TIR, the collimating stage 604 accepts the first reflected light 528, which passes through two sides of a bubble structure 510, creating a collimated light 608. For incident angles greater than the critical angle for TIR, the extraction stage 610 reflects the collimated light 608 off a side 514 of a bubble structure for egress via the waveguide top surface. As shown in this figure, but which is also true for the waveguides of FIGS. 5 through 7, the waveguide panel 502 has a minimal thickness equal to (H 516+h 522). Other angles of propagated light, i.e. less than the maximum angle ($\alpha$), may reflect off a bubble structure, out of the waveguide top surface, in a single stage (a single bubble structure encounter).

Functional Description

Figure 9:
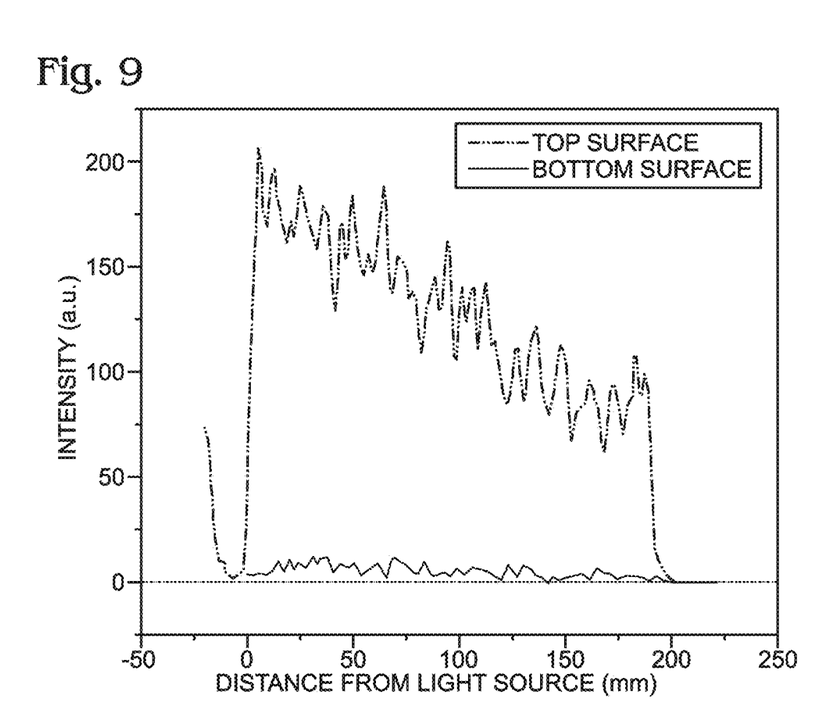
FIG. 9 is a graph depicting the contrast between waveguide top and bottom light extraction for a waveguide designed using the principles illustrated in FIGS. 5 through 7.

FIG. 9 is a graph depicting the contrast between waveguide top and bottom light extraction for a waveguide designed using the principles illustrated in FIGS. 5 through 7. 95% of the light is now being extracted from the top surface.

Figure 10:
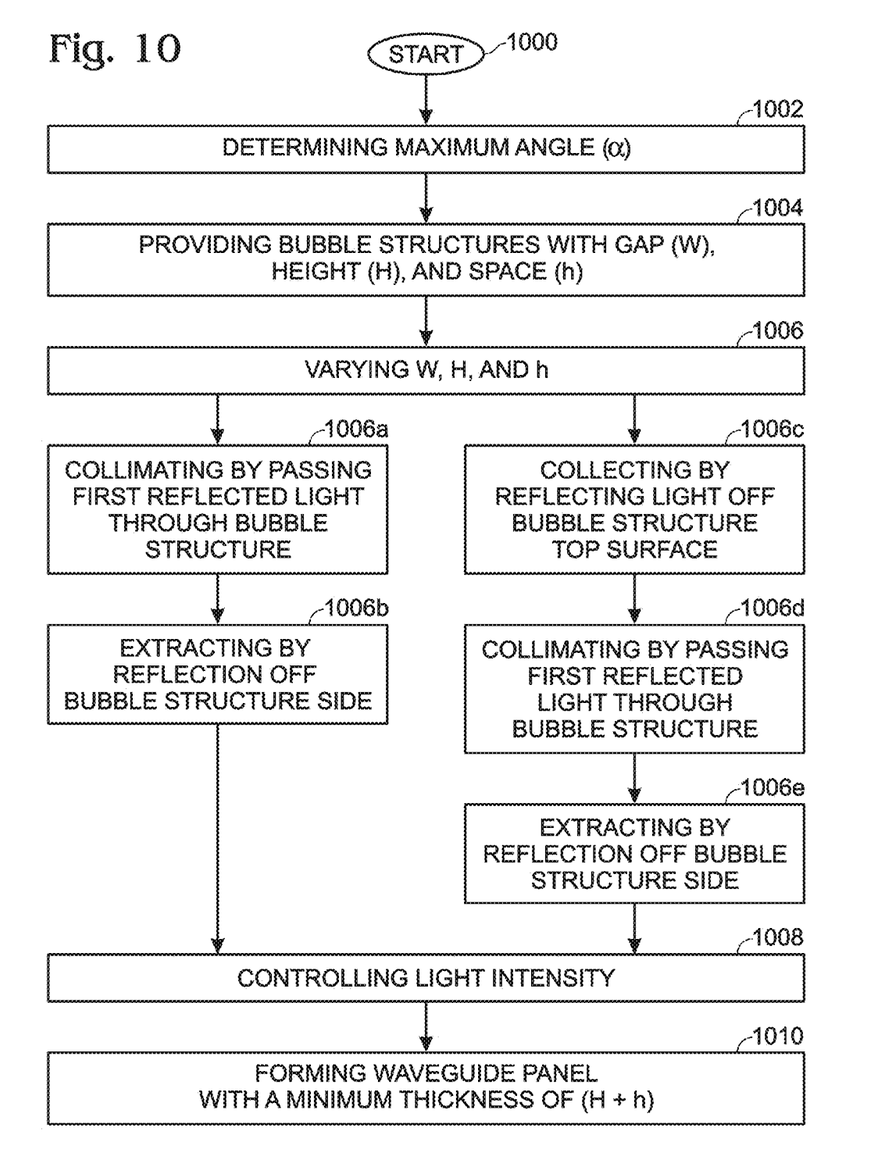
FIG. 10 is a flowchart illustrating a method for using bubble structures to control the extraction of light from a waveguide top surface.

FIG. 10 is a flowchart illustrating a method for using bubble structures to control the extraction of light from a waveguide top surface. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1000.

Step 1002 determines a maximum angle ($\alpha$) of light propagation through a waveguide medium relative to a first horizontal direction parallel to a waveguide top surface. In one aspect, Step 1002 determines the maximum angle ($\alpha$) of light propagation through a waveguide medium by solving:

$$\alpha \leq \sin^{-1}(1/n);$$

where n is the refractive index of the waveguide medium.

Step 1004 provides a plurality of bubble structures having a refractive index less than the waveguide medium. For example, the waveguide medium may be a polymer or glass, and bubble structures may be an air or vacuum medium. The bubble structures have a base, and sides formed at an acute angle upwards with respect to the base. The bubble structure bases are separated by gap (W), and have a height (H) and a top separated from a waveguide top surface by a space (h). Step 1006 varies the gap (W), the height (H), and the space (h). In response to varying W, H, and h, Step 1008 controls the intensity of light extracted, having the maximum angle ($\alpha$) of light propagation, from the waveguide top surface. Likewise, Step 1008 controls the intensity of light extracted, having an angle of light propagation less than the maximum (a), from the waveguide top surface. In one aspect, Step 1010 forms a waveguide having a minimal thickness equal to (H+h).

Considering the large number of variables, the method may be enabled as software instructions stored in a non-transitory memory and executed by a processor. That is, the method may be enabled as machine instructions stored in a non-transitory or computer-readable memory. Alternately, some of these functions may be performed in hardware, such as a field programmable gate array (FPGA) or a dedicated hardware application-specific integrated circuit (ASIC). The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

In one aspect, Step 1006 includes varying W, H, and h, so that when light propagating through the waveguide with the maximum angle ($\alpha$) reflects off the waveguide top surface, creating a first reflected light, the first reflected light encounters a bubble structure. For example, Step 1006 may vary the gap (W), the height (H), and the space (h) in Step 1006 includes using a two-step extraction method in the following substeps. Step 1006a describes a collimation stage where, for incident angles less than a critical angle for TIR, the first reflected light passes through two sides of a bubble structure, creating a collimated light. Step 1006b describes an extraction stage where, for incident angles greater than the critical angle for TIR, the collimated light reflects off a side of a bubble structure and exits via the waveguide top surface. These substeps might be enabled with the use of cone or pyramid shaped bubble structures, although other structures having a peaked, as opposed to flat, top surface may also be used.

In another aspect, providing the bubble structures in Step 1004 includes providing frustum bubble structures with flat top surfaces parallel to the waveguide top surface. Some examples of frustum structures include a frustum-cone and frustum-pyramid, although other structure with flat top surface may also enable the method. Then, varying the gap (W), the height (H), and the space (h) in Step 1006 includes solving:

$$\tan(\alpha) \approx (h+H)/W.$$

Alternatively, if flat top surface bubble structures are provided in Step 1004, Step 1006 may use a three-step extraction method in the following substeps. Step 1006c describes a collecting stage where the first reflected light reflects off a bubble structure top surface, creating a second reflected light, and the second reflected light reflects off the waveguide top surface, creating a third reflected light. Step 1006d describes a collimation stage where, for incident angles less than a critical angle for total internal reflection (TIR), the third reflected light passes through two sides of a bubble structure, creating a collimated light. Step 1006e describes an extraction stage where, for incident angles greater than the critical angle for TIR, the collimated light reflects off a side of a bubble structure and exits via the waveguide top surface.

In another variation using frustum bubble structures with flat top surfaces, Step 1006 uses a combination of three-step and two-step extraction methods. For some rays propagating through the waveguide panel the three-step extraction method is performed, and Steps 1006c, 1006d, and 1006e are enacted. For other rays propagating through the waveguide panel the two-step extraction method is performed, and Step 1006a and 1006b are enacted.

A system and method have been provided for using bubble structures to control the extraction of light from a waveguide top surface. Examples of particular bubble structures (light extraction features), such a frustum-pyramid shape, have been presented to illustrate the invention. However, the invention is not limited to merely these examples. Other variations and embodiments of the invention will occur to those skilled in the art.

We claim:

1. A method for using bubble structures to control the extraction of light from a waveguide top surface, the method comprising:

determining a maximum angle ($\alpha$) of light propagation through a waveguide medium relative to a first horizontal direction parallel to a waveguide top surface;

providing a plurality of bubble structures having a refractive index less than the waveguide medium, where the bubble structures have a base and sides formed at an acute angle upwards with respect to the base, where the bubble structure bases are separated by gap (W), and have a height (H), and a top separated from a waveguide top surface by a space (h);

varying the gap (W), the height (H), and the space (h); and, in response to varying W, H, and h, controlling the intensity of light extraction, having the maximum angle (α) of light propagation, from the waveguide top surface.

2. The method of claim 1 wherein controlling the intensity of light extracted from the waveguide top surface includes controlling the intensity of light extracted having an angle of light propagation less than the maximum (α), from the waveguide top surface.

3. The method of claim 1 wherein providing the bubble structures includes providing frustum bubble structures with flat top surfaces parallel to the waveguide top surface; and, wherein varying the gap (W), the height (H), and the space (h), includes solving:

$$\tan(\alpha) \approx (h+H)/W.$$

4. The method of claim 1 wherein varying the gap (W), the height (H), and the space (h), includes varying W, H, and h, so that when light propagating through the waveguide with the maximum angle (α) reflects off the waveguide top surface, creating a first reflected light, the first reflected light encounters a bubble structure.

5. The method of claim 4 wherein providing the bubble structures includes providing frustum bubble structures with flat top surfaces parallel to the waveguide top surface; wherein varying the gap (W), the height (H), and the space (h), includes using a three-step extraction method as follows:
  in a collecting stage, the first reflected light reflecting off a bubble structure top surface, creating a second reflected light, and the second reflected light reflecting off the waveguide top surface, creating a third reflected light;
  for incident angles less than a critical angle for total internal reflection (TIR), in a collimating stage, the third reflected light passing through two sides of a bubble structure, creating a collimated light; and,
  for incident angles greater than the critical angle for TIR, in an extraction stage, the collimated light reflecting off a side of a bubble structure and exiting via the waveguide top surface.

6. The method of claim 4 wherein varying the gap (W), the height (H), and the space (h), includes using a two-step extraction method as follows:
  for incident angles less than a critical angle for TIR, in a collimating stage, the first reflected light passing through two sides of a bubble structure, creating a collimated light; and,
  for incident angles greater than the critical angle for TIR, in an extraction stage, the collimated light reflecting off a side of a bubble structure and exiting via the waveguide top surface.

7. The method of claim 4 wherein providing the bubble structures includes providing frustum bubble structures with flat top surfaces;
  wherein varying the gap (W), the height (H), and the space (h), includes using a combination of three-step and two-step extraction methods:
    where the three-step extraction method is as follows:
      in a collecting stage, the first reflected light reflecting off a bubble structure top surface, creating a second reflected light, the second reflected light reflecting off the waveguide top surface, creating a third reflected light;
      for incident angles less than a critical angle for TIR, in a collimating stage, the third reflected light passing through two sides of a bubble structure, creating a collimated light;
      for incident angles greater than the critical angle for TIR, in an extraction stage, the collimated light reflecting off a side of a bubble structure and exiting via the waveguide top surface;
    where the two-step extraction method is as follows:
      for incident angles less than the critical angle for TIR, in a collimating stage the first reflected light passing through two sides of a bubble structure, creating a collimated light; and,
      for incident angles greater than the critical angle for TIR, in an extraction stage, the collimated light reflecting off a side of a bubble structure and exiting via the waveguide top surface.

8. The method of claim 1 wherein providing the bubble structures includes providing bubble structures made from an air medium.

9. The method of claim 1 wherein providing the bubble structures includes providing bubble structures selected from a group consisting of a frustum-pyramid, frustum-cone, cone, and pyramid shape.

10. The method of claim 1 further comprising:
  forming a waveguide having a minimal thickness equal to (H+h).

11. The method of claim 1 wherein determining the maximum angle (α) of light propagation through a waveguide medium includes solving $$\alpha \approx \sin^{-1}(1/n);$$

where n is the refractive index of the waveguide medium.

12. A waveguide with bubble structures for controlling light extraction, the waveguide comprising:
  a waveguide panel formed from a medium, the waveguide panel having a top surface for light extraction and at least one side surface for light insertion;
  a plurality of bubble structures embedded in the waveguide panel having a refractive index less than the waveguide medium, where the bubble structures have a base parallel to the waveguide top surface, and sides formed at an acute angle upwards with respect to the base, where the bubble structure bases are separated by gap (W), and have a height (H), and a top separated from a waveguide top surface by a space (h); and,
  wherein the gap (W), the height (H), and the space (h) are defined with respect to a maximum angle (α) of light propagation through a waveguide medium relative to a first horizontal direction parallel to a waveguide top surface.

13. The waveguide of claim 12 wherein the bubble structures are frustum bubble structures with flat top surfaces parallel to the waveguide top surface;
  wherein the gap (W), the height (H), and the space (h), are defined as follows:

$$\tan(\alpha) \approx (h+H)/W.$$

14. The waveguide of claim 12 wherein the bubble structures are defined so that when light propagating through the waveguide with the maximum angle (α) reflects off the waveguide top surface, creating a first reflected light, the first reflected light encounters a bubble structure.

15. The waveguide of claim 14 wherein the bubble structures have flat top surfaces parallel to the waveguide top surface, and where combinations of bubble stages comprise:
  a collecting stage reflecting the first reflected light off a bubble structure top surface, creating a second reflected light;
  for incident angles less than a critical angle for total internal reflection (TIR), a collimating stage accepting a third reflected light, which is the result of the second reflected light reflecting off the waveguide top surface, that passes through two sides of a bubble structure, creating a collimated light; and, for incident angles greater than the critical angle for TIR, an extraction stage reflecting the collimated light off a side of a bubble structure for egress via the waveguide top surface.

16. The waveguide of claim 14 wherein combinations of bubble structures comprise:

for incident angles less than a critical angle for TIR, a collimating stage accepting the first reflected light passing through two sides of a bubble structure, creating a collimated light; and, for incident angles greater than the critical angle for TIR, an extraction stage reflecting the collimated light off a side of a bubble structure for egress via the waveguide top surface.

17. The waveguide of claim 14 wherein the bubble structures comprise a first combination and a second combination of bubble structures as follows;

the first combination comprising:

a collecting stage reflecting the first reflected light off a bubble structure top surface, creating a second reflected light;

for incident angles less than a critical angle for total internal reflection (TIR), a collimating stage accepting a third reflected light, which is the result of the second reflected light reflecting off the waveguide top surface, that passes through two sides of a bubble structure, creating a collimated light;

for incident angles greater than the critical angle for TIR, an extraction stage reflecting the collimated light off a side of a bubble structure for egress via the waveguide top surface;

the second combination comprising:

for incident angles less than a critical angle for TIR, a collimating stage accepting the first reflected light passing through two sides of a bubble structure, creating a collimated light; and, for incident angles greater than the critical angle for TIR, an extraction stage reflecting the collimated light off a side of a bubble structure for egress via the waveguide top surface.

18. The waveguide of claim 12 wherein the bubble structures made from an air medium.

19. The waveguide of claim 12 wherein the bubble structures are selected from a group consisting of a frustum-pyramid, frustum-cone, cone, and pyramid shape.

20. The waveguide of claim 12 further comprising:

wherein the waveguide panel has a minimal thickness equal to (H+h).

21. The waveguide of claim 12 wherein the maximum angle ($\alpha$) of light propagation through a waveguide medium is $$\alpha \approx \sin^{-1}(1/n);$$

where n is the refractive index of the waveguide medium.

* * * * *

UNITED STATES PATENT AND TRADEMARK OFFICE
CERTIFICATE OF CORRECTION

| | | |
|---|---|---|
| PATENT NO. | : 8,630,518 B2 | Page 1 of 1 |
| APPLICATION NO. | : 13/484346 | |
| DATED | : January 14, 2014 | |
| INVENTOR(S) | : Jiandong Huang | |

It is certified that error appears in the above-identified patent and that said Letters Patent is hereby corrected as shown below:

In the Specification

In column 5, line 18, a formula has been incorrectly printed, showing a "$\leq$" symbol, instead of a "$\approx$" symbol.

Signed and Sealed this
Eleventh Day of March, 2014

Michelle K. Lee
*Deputy Director of the United States Patent and Trademark Office*